April 11, 1950 P. E. BESSIERE 2,503,704
ELECTRIC APPARATUS COOLING SYSTEM
Filed Feb. 19, 1948 2 Sheets-Sheet 2
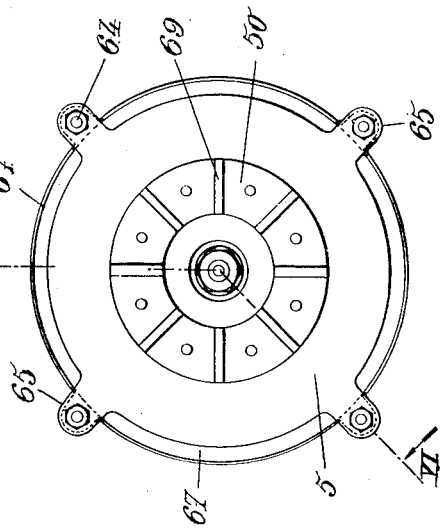
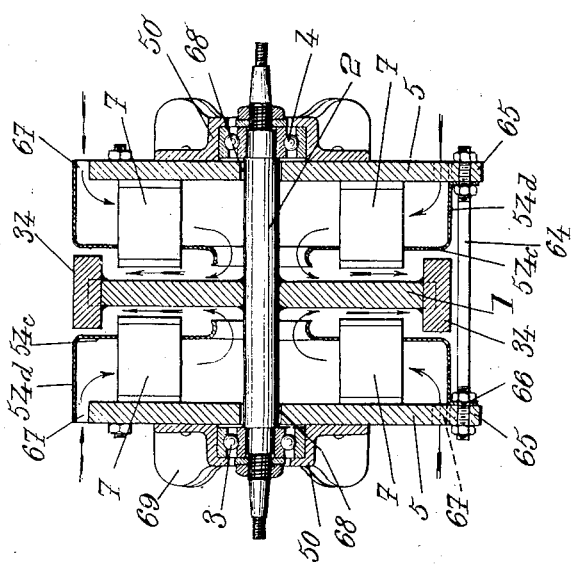
INVENTOR
Pierre Etienne Bessiere
BY
AGENTS Patented Apr. 11, 1950

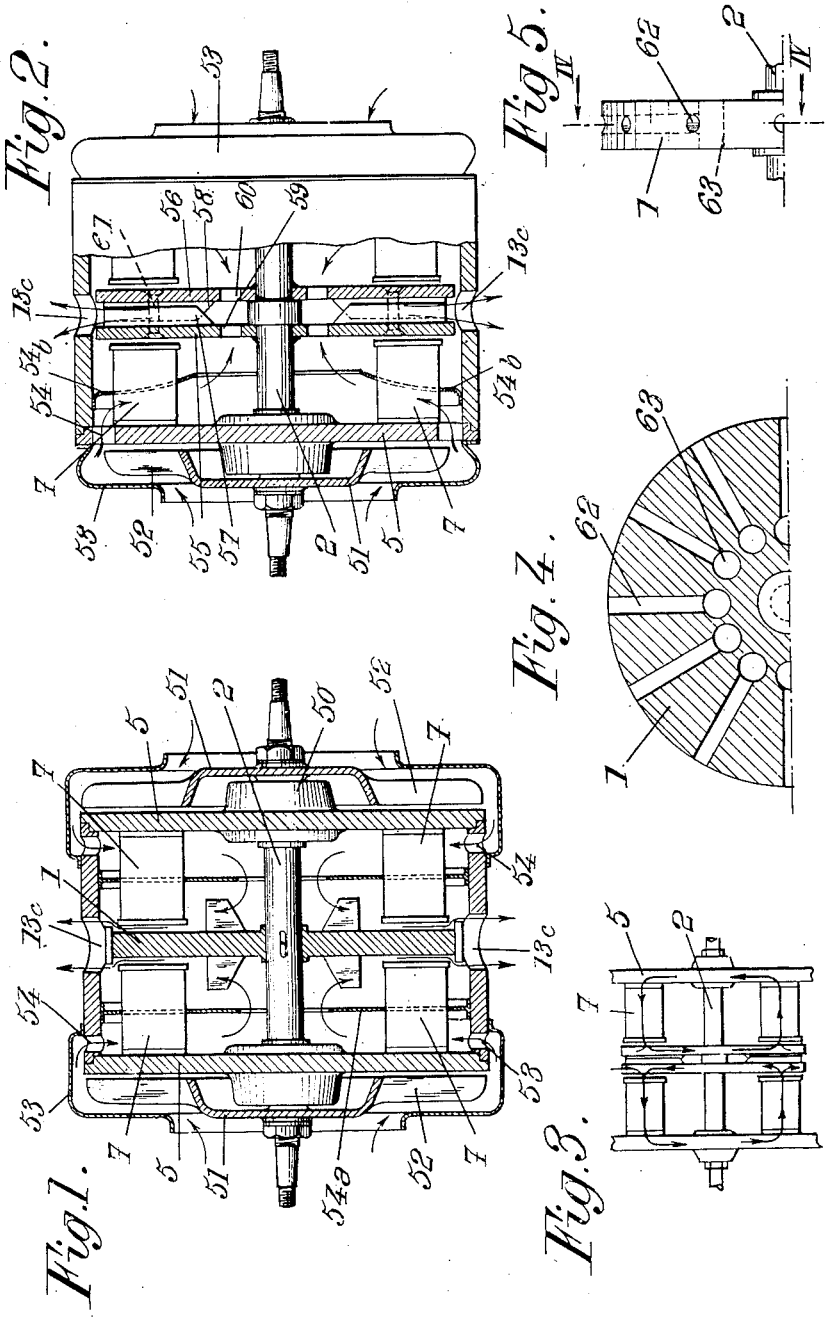

2,503,704

UNITED STATES PATENT OFFICE 2,503,704

ELECTRIC APPARATUS COOLING SYSTEM

Pierre Etienne Bessière, Paris, France, assignor to Societe Electro-Mecanique de l'Aveyron, S. A., Rodez, France, a society of the Republic of France Application February 19, 1948, Serial No. 9,505
In France February 28, 1947

9 Claims. (Cl. 172—285)

1

The present invention relates to electric apparatus cooling systems and it is more especially, but not exclusively, concerned with electric brakes, that is to say brakes in which a rotor, preferably of magnetic metal and rigid with the shaft to be braked, rotates in the magnetic field produced by electro-magnets, the braking effect being due to the eddy currents thus created in the rotor.

In the course of braking, a considerable amount of heat due to the Joule effect accumulates in said rotor, which amount is to be quickly dissipated into the surrounding atmosphere, so that neither the rotor nor the shaft bearings are heated to a detrimental temperature. This is why electric brakes of the kind in question are fitted with powerful means for cooling the rotor and its bearings.

The object of the present invention is to provide a cooling system of this kind which is better adapted to meet the requirements of practice than those used up to now.

According to a feature of my invention, cooling of the brake is ensured by a cooling air stream produced by a fan disposed coaxially with the carcass of the brake and driven from the shaft thereof, said fan being of a diameter substantially equal to that of the brake carcass, so as to increase, for a given angular velocity, the peripheral speed of the fan without substantially increasing the space occupied by the whole.

Still another feature consists in providing, inside the rotor, channels directed from center toward periphery and through which cooling air flows in this direction.

Still another feature consists in dividing into two chambers, by means of a partition, each of the spaces located on either side of the rotor and containing the electro-magnets, and in circulating through these chambers, solely through the fan action of the rotor, air streams which flow first toward the center through the outer chamber and then toward the periphery through the inner chamber, in contact with the rotor, these air streams being sucked in through inlet apertures provided at the periphery or close to the periphery of the outer chamber and discharged at the periphery of the inner chamber.

Still another feature consists in constituting the boxes which contain the ball bearings of the rotor shaft of a metal which is a good conductor of heat, such as aluminium, and in fixing these bearings on the outer faces of the side plates of the brake casing.

Preferred embodiments of the present invention will be hereinafter described with reference to

2 the accompanying drawings, given merely by way of example and in which:

Fig. 1 shows, in diagrammatic axial section, an electric brake provided with a cooling system made according to an embodiment of my invention;

Fig. 2 shows, also in diagrammatic axial section, a modification;

Fig. 3 diagrammatically shows, in plan view, two pairs of pole pieces located on either side of a brake rotor according to Fig. 2, and also the path of the magnetic flux, when the brake is working;

Figs. 4 and 5 show, in section and in elevation respectively, a modification of the rotor of Fig. 2;

Fig. 6 shows, in section, on the line 6—6 of Fig. 7, a brake provided with a cooling system made according to still another embodiment of my invention;

Fig. 7 is a side view corresponding to Fig. 6.

The electric brake proper, excluding the cooling means thereof, may be of any suitable construction, for instance as illustrated by the drawings.

This brake includes a rotor 1 made of a magnetic metal, for instance mild steel, and preferably disc-shaped fixed to a shaft 2 journalled, on either side of rotor 1, in the side plates 5 of a frame secured to the chassis of the vehicle on which the brake is fitted. Side plates 5 further carry pole pieces 6 fitted with inductor windings and disposed on either side of rotor 1.

When these windings are supplied with current, the magnetic lines of force pass through rotor 1 which, when rotated, undergoes both a powerful braking action and an intensive heating. It is therefore necessary to provide cooling means for dissipating the heat created in the rotor when a braking action is exerted, into the surrounding atmosphere, so as thus to preserve the rotor against destruction.

In order to ensure, even for relatively low velocities of shaft 2, a powerful cooling, it is of interest to make use of fan means of the greatest possible diameter without substantially increasing the over all dimensions of the brake.

Therefore, according to a feature of my invention, a fan device disposed coaxially with the carcass of the brake is given a diameter substantially equal to that of said carcass.

For instance, as shown by Fig. 1, shaft 2 carries, on either side of the brake, the rotary portions of two fans, each rotary portion being constituted by a central part or hub 51 and by blades 52. Each rotary portion is enclosed in a casing 53 fixed on the brake carcass, and the peripheral portion of the carcass, inside each casing 53, is provided with inlet apertures 54 through which the air delivered by the fan enters said carcass. This air stream follows for instance the path of travel indicated by the arrows, i. e. it is first directed toward the center, on the outer side of partitions 54a provided inside the carcass, so as thus to cool the outer ends of pole pieces 6, after which it flows in the opposite direction, on the other side of partitions 54a, along the faces of rotor 1 and along the inner ends of pole pieces 6, and escapes into the surrounding atmosphere through apertures 13c provided in the central portion of the brake carcass cylindrical wall.

With this arrangement, owing to the large diameter of fan 51, 52, 53, I obtain an intensive cooling air stream even for relatively low numbers of revolutions of the shaft.

According to a modification illustrated by Fig. 2, the apertures through which the cooling air streams enter the carcass are provided not in the peripheral wall, but in the side walls 5 thereof, near their external edges, and the casing 53 of the fan can thus be made of a diameter which does not exceed the external diameter of the carcass. I thus avoid any increase of the external diameter of the brake.

Still another feature of the invention consists in providing in the rotor passages extending between the central and peripheral portions thereof, through which cooling air is caused to flow in the outward direction, the lateral faces of the rotor being preferably also swept by air streams of the same direction. I thus obtain a very intensive cooling both of the inside and the outside of the rotor.

Figs. 2 to 5 show two embodiments of this last mentioned feature. According to Figs. 2 and 3, the rotor, which is rigid with shaft 2, is constituted by two discs 55 and 56 carrying, on their inner sides, fins in the form of blades 57, 58 and provided, near their center, with apertures 59 and 60. Discs 55, 56 are connected together by means of bolts or rivets 61, the two discs being set in such angular relation to each other that the blades 58 of disc 56 are located in the intervals between the blades 57 of disc 55. The rotor thus constituted acts as a fan rotor which sucks in air through apertures 59, 60 to deliver it radially to the outside atmosphere through apertures 13c provided in the periphery of the brake carcass. The air sucked in by the rotor is constituted, in the embodiment shown by Fig. 2, by a portion of the air introduced into the carcass by fan 51, 52, 53 and directed toward the center of the carcass by means of guiding surfaces 54b. Another portion of the air forced into the carcass flows along the outer faces of discs 55, 56, to escape also through apertures 13c.

In view of the high resistance opposed by a rotor such as shown by Fig. 2 to the magnetic flux, the pole pieces located on either side of this rotor should be disposed in such manner that the flux passes from one pole piece, through the disc which is immediately adjacent to this piece, into the next pole piece on the same side as the first one (see Fig. 3 where the magnetic flux is indicated by arrows).

According to another embodiment of this last mentioned feature of the invention, shown by Figs. 4 and 5, rotor 1 is of a single piece in which are provided several radial channels 62 opening at one of their ends into the periphery of rotor 1 and, at the other end, into channels 63 parallel to the axis of the rotor and extending throughout said rotor. The cooling action of channels 62, 63 is analogous to the cooling action of the channels provided on the inside of the rotor shown by Fig. 2. However, in view of the fact that the resistance of disc 1, made of a single piece, to the magnetic flux is lower than that opposed to the magnetic flux by the rotor shown by Fig. 2, disc 1 can be used in combination either with pole pieces creating a magnetic flux such as shown by Fig. 3 or with pole pieces producing a flux passing throughout the rotor, in a direction parallel to the axis thereof.

In the embodiment of Figs. 6 and 7, the air stream circulating in the carcass successively through two chambers formed by baffle-like partitions 54c is produced by the fan action of rotor 1 alone. In this case the carcass is essentially constituted by two side plates 5 supporting the electro-magnets 7 and connected together by stay rods 64 fixed in lugs 65 with which each of the side plates is provided. The distance between stay rods 64, the number of which is for instance equal to four, and the axis of revolution of rotor 1 being greater than the outer radius of the rotor, whereby the latter can turn freely inside the space limited by said rods.

Concerning partitions 54c, they are provided with cylindrical flanges 54d so as to form, on the outer sides of said partitions 54c, inlet chambers into which air enters through an interval 67 left between each of said flanges 54d and the corresponding side plate 5 and running along the whole periphery of said side plates between the lugs 65 thereof.

Flanges 54d are fixed by means of nuts 66 to lugs 65, these nuts being screwed on stay rods 64.

Rotor 1 is preferably provided with blades 34 fixed in grooves formed in the periphery of disc 1, so as thus to increase the fan action of the rotor. At the same time, these blades facilitate dissipation into the surrounding atmosphere of the heat created in the rotor.

According to still another feature of the invention, the bearing boxes 50 which contain the ball bearings 3 and 4 in which shaft 2 is journalled are made of a metal which is a good conductor of heat, such as aluminium, and these bearing boxes are fixed on the external faces of the lateral side plates 5 of the casing, these side plates being provided with apertures 68 which afford passage for shaft 2 with a play as reduced as possible.

Preferably bearing boxes 50 are provided with fins 69 serving to increase the area of contact of bearing boxes 50 with the surrounding atmosphere.

Due to the arrangement of bearing boxes 50 with ball bearings 3 and 4 on the outer sides of side plates 5, these ball bearings are efficiently protected against heat radiation from the hot parts located on the inside of the carcass. Transmission of heat through shaft 2, toward ball bearings 3 and 4 is considerably reduced by the cooling effect of the air streams flowing through the inside of the carcass on the portions of shaft 2 located on either side of rotor 1, between the latter and the bearings. The amount of heat which however might reach ball bearings 3, 4 and bearing boxes 50 is very quickly dissipated into the surrounding air, whereby these ball bearings and bearing boxes cannot in any way reach temperatures which might interfere with their good operation.

In a general manner, while I have, in the above description, disclosed what I deem to be practical and efficient embodiments of my invention, it should be well understood that I do not wish to be limited thereto as there might be changes made in the arrangement, disposition and form of the parts without departing from the principle of the present invention as comprehended within the scope of the accompanying claims.

What I claim is:

1. For use in connection with an electric brake including a carcass comprising two side plates parallel to and at a distance from each other, electromagnets having their respective axes at right angles to said side plates and carried by them, said electro-magnets being distributed, about an axis perpendicular to said side plates, in two circular rows, one on either side of the middle plane of said carcass parallel to said side plates, a circular disc-shaped rotor having its axis in coincidence with the above mentioned axis and its plane of symmetry in coincidence with said middle plane so as to divide the inside of said carcass into two spaces, one on either side of said rotor, the faces of said rotor being at a distance from said electromagnets, a shaft for said rotor, bearings for said shaft carried by said side plates and peripheral wall means coaxial with said shaft carried by said side plates and surrounding at least a portion of said electro-magnets, a cooling device which comprises, in combination, a baffle partition in each of the above mentioned spaces extending transversely to said axis from said peripheral wall means to a distance from said shaft so as to divide said space into an outer chamber, adjacent to the corresponding side plate, and an inner chamber, adjacent to said rotor and including the intervals between said rotor and the electromagnets, said carcass being provided with inlet apertures in the peripheral portions thereof, opening into said outer chambers, and with at least one outlet from said inner chambers formed in said peripheral wall means and opening to the atmosphere, and means for circulating cooling air streams from said inlet apertures to said outlet.

2. For use in connection with an electric brake including a carcass comprising two side plates parallel to and at a distance from each other, electro-magnets having their respective axes at right angles to said side plates and carried by them, said electro-magnets being distributed, about an axis perpendicular to said side plates, in two circular rows, one on either side of the middle plane of said carcass parallel to said side plates, a circular disc-shaped rotor having its axis in coincidence with the above mentioned axis and its plane of symmetry in coincidence with said middle plane so as to divide the inside of said carcass into two spaces, one on either side of said rotor, the faces of said rotor being at a distance from said electro-magnets, a shaft for said rotor, bearings for said shaft carried by said side plates and peripheral wall means coaxial with said shaft carried by said side plates and surrounding at least a portion of said electro-magnets, a cooling device which comprises, in combination, a baffle partition in each of the above mentioned spaces extending transversely to said axis from said peripheral wall means to a distance from said shaft so as to divide said space into an outer chamber, adjacent to the corresponding side plate, and an inner chamber, adjacent to said rotor and including the intervals between said rotor and the electromagnets, two fan casings carried by said carcass, coaxially mounted thereon and located on the outer sides of the side plates thereof, the outer diameters of said fan casings being at least approximately equal to that of said carcass, and fan blades carried by said shaft rotatable in said fan casings, said carcass being provided with inlet apertures in the peripheral portions thereof, connecting the inside of said fan casings with said outer chambers, and with at least one outlet from said inner chambers formed in said peripheral wall means and opening to the atmosphere.

3. An electric brake cooling device according to claim 1 in which said rotor is provided with at least one inner passage extending from the central portion to the periphery thereof and at least one passage connecting said inner passage with said inner chambers of the spaces located on either side of the rotor.

4. An electric brake cooling device according to claim 1 in which said rotor is made of two parallel discs leading between them an inner passage open at the periphery of the disc, said discs being provided with holes connecting the passage between said discs with said inner chambers of the spaces located on either side of the rotor.

5. An electric brake cooling device according to claim 1 in which said rotor is made of two parallel discs leading between them an inner passage open at the periphery of the disc, said discs being provided with holes connecting the passage between said discs with said inner chambers of the spaces located on either side of the rotor further including intermeshing fan blades carried by the respective inner faces of said discs.

6. An electric brake cooling device according to claim 1 in which said rotor is provided with a plurality of radial passages extending therein from the periphery thereof to a distance from its axis and longitudinal holes connecting the inner ends of said radial passages with said inner chambers of the spaces located on either side of the rotor.

7. For use in connection with an electric brake including a carcass comprising two side plates parallel to and at a distance from each other, electro-magnets having their respective axes at right angles to said side plates and carried by them, said electro-magnets being distributed, about an axis perpendicular to said side plates, in two circular rows, one on either side of the middle plane of said carcass parallel to said side plates, a circular disc-shaped rotor having its axis in coincidence with the above mentioned axis and its plane of symmetry in coincidence with said middle plane so as to divide the inside of said carcass into two spaces, one on either side of said rotor, the faces of said rotor being at a distance from said electro-magnets, a shaft for said rotor, bearings for said shaft carried by said side plates and peripheral wall means coaxial with said shaft carried by said side plates and surrounding at least a portion of said electro-magnets, a cooling device which comprises, in combination, a baffle partition in each of the above mentioned spaces extending transversely to said axis from said peripheral wall means to a distance from said shaft so as to divide said space into an outer chamber, adjacent to the corresponding side plate, and an inner chamber, adjacent to said rotor and including the intervals between said rotor and the electro-magnets, said carcass being provided with inlet apertures in the peripheral portions thereof, opening directly from the atmosphere into said outer chambers, and with at least one outlet from said inner chambers formed in said peripheral wall means and opening into the atmosphere, and fan means carried by said rotor for circulating cooling air streams from said inlet apertures to said outlet.

8. An electric brake cooling device according to claim 1 further including bearing boxes for said shaft bearings made of a metal which is a good conductor of heat, said shaft bearings being located on the outer sides of said side plates.

9. For use in connection with an electric brake including a carcass, electro-magnets having their respective axes parallel to one another carried by said carcass, said electro-magnets being distributed about a common axis parallel to the respective axes of said electro-magnets, in two circular rows, one on either side of the middle plane of said carcass, a circular disc-shaped rotor having its axis in coincidence with said common axis so as to divide the inside of said carcass into two spaces, one on either side of said rotor, the faces of said rotor being at a distance from said electro-magnets, and a shaft for said rotor, a cooling device which comprises, in combination, a baffle means in at least one of the above mentioned spaces carried by said carcass and extending transversely to said common axis from the periphery of the carcass to a distance from said shaft so as to divide said space into an outer chamber, adjacent to the corresponding side portion of the carcass, and an inner chamber, adjacent to said rotor and including the intervals between said rotor and the electro-magnets, said carcass being provided with at least one inlet in the peripheral portion thereof, opening into said outer chamber, and at least one outlet from said inner chamber opening to the atmosphere, and means for circulating cooling air streams from said inlet to said outlet.

PIERRE ETIENNE BESSIÈRE.

REFERENCES CITED

The following references are of record in the file of this patent:

UNITED STATES PATENTS

| Number | Name | Date |
|---|---|---|
| 2,068,820 | Sarazin et al. | Jan. 26, 1937 |
| 2,355,484 | Teker | Aug. 8, 1944 |